US012205553B2

(12) United States Patent
Kanbara (10) Patent No.: US 12,205,553 B2
(45) Date of Patent: Jan. 21, 2025

(54) BACKLIGHT DEVICE AND LIQUID CRYSTAL DISPLAY APPARATUS

(71) Applicant: Sharp Display Technology Corporation, Kameyama (JP)

(72) Inventor: Nariya Kanbara, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/534,339

(22) Filed: Dec. 8, 2023

(65) Prior Publication Data

US 2024/0233660 A1 Jul. 11, 2024

Related U.S. Application Data

(60) Provisional application No. 63/437,480, filed on Jan. 6, 2023.

(51) Int. Cl.
| G09G 3/36 | (2006.01) |
| G02F 1/13357 | (2006.01) |
| G09G 3/34 | (2006.01) |

(52) U.S. Cl.
CPC ..... *G09G 3/3426* (2013.01); *G02F 1/133603* (2013.01); *G09G 2300/0842* (2013.01); *G09G 2320/0646* (2013.01)

(58) Field of Classification Search
CPC .... G09G 3/342; G09G 3/3426; G09G 3/3666; G09G 2300/0842; G09G 2320/0646; G02F 1/133603
See application file for complete search history.

(56) References Cited

U.S. PATENT DOCUMENTS

| 9,717,124 | B2* | 7/2017 | Tsuchida | H05B 47/16 |
| 11,138,925 | B1* | 10/2021 | Wang | G09G 3/32 |
| 11,615,752 | B2* | 3/2023 | Lee | G09G 5/10 |
| | | | | 345/204 |
| 11,900,865 | B2* | 2/2024 | Kwak | G09G 3/3426 |
| 12,080,236 | B2* | 9/2024 | Zhou | G09G 3/3233 |
| 2011/0050743 | A1 | 3/2011 | Park et al. | |
| 2012/0025739 | A1* | 2/2012 | Tomiyoshi | H05K 1/142 |
| | | | | 315/312 |
| 2016/0284283 | A1* | 9/2016 | Kurita | G09G 3/2081 |
| 2022/0319451 | A1* | 10/2022 | Liu | G09G 3/3426 |

FOREIGN PATENT DOCUMENTS

CN 116564235 A * 8/2023

* cited by examiner

*Primary Examiner* — Joe H Cheng
(74) *Attorney, Agent, or Firm* — ScienBiziP, P.C.

(57) ABSTRACT

A backlight device includes: a plurality of LED elements arranged in a plurality of regions including a first region and a second region; a plurality of LED drive circuits configured to generate LED drive signals configured to drive the LED elements; a control circuit configured to outputs a vertical synchronization signal and current setting data configured to set luminance of the LED elements; and a time constant circuit that delays the vertical synchronization signal by a predetermined time. The LED drive circuits includes a first LED drive circuit associated with the LED elements in the first region. The time constant circuit includes a first time constant circuit connected to the first LED drive circuit. The first LED drive circuit is configured to receive the current setting data output from the control circuit and receive the first vertical synchronization signal delayed by the first time constant circuit.

13 Claims, 10 Drawing Sheets

| BA11       | BA12       | BA13       |
| d11=Da1    | d12= Da2   | d13= Da3   |

| BA21         | BA22         | BA23         |
| d21= Da1+Db1 | d22= Da2+Db1 | d23= Da3+Db1 |

| BA31         | BA32         | BA33         |
| d31= Da1+Db2 | d32= Da2+Db2 | d33= Da3+Db2 |

| BA41         | BA42         | BA43         |
| d41= Da1+Db3 | d42= Da2+Db3 | d43= Da3+Db3 |

BACKLIGHT DEVICE AND LIQUID CRYSTAL DISPLAY APPARATUS

CROSS-REFERENCE TO RELATED APPLICATION

The present application claims priority from Provisional Application No. 63/437,480 the content to which is hereby incorporated by reference into this application.

BACKGROUND

1. Field

The present invention relates to a backlight device to be disposed on a back surface side of a liquid crystal display apparatus and a liquid crystal display apparatus including such a backlight device.

2. Description of the Related Art

As a backlight device of a liquid crystal display apparatus, a backlight device including a plurality of LED elements is used. The backlight device including a plurality of LED elements can be driven by a driving method called "local dimming".

In the local dimming, the light emission luminance of the LED element is adjusted for each region in accordance with the image to be displayed on a liquid crystal display panel arranged to receive the light emitted from the backlight device. Adoption of the local dimming can improve a contrast ratio of an image to be displayed, and also can reduce power consumption.

In the backlight device that can perform local dimming, the light emission luminance of the plurality of LED elements can be independently controlled for each region by a plurality of LED drive circuits. Each of the plurality of LED drive circuits drives a plurality of LED light emitting elements arranged in a corresponding region of a plurality of regions.

SUMMARY

However, when the plurality of LED drive circuits are operated in synchronization with a vertical synchronization signal to be supplied to the liquid crystal display panel, the plurality of LED drive circuits may simultaneously change the LED drive current. Then, the inrush current of an LED power supply increases, and the drop of the power supply voltage of the LED may increase. The LED element is turned off when the power supply voltage of the LED falls below a Vf voltage of the LED, and in order to avoid this, for example, the power supply voltage of the LED is set to be high. Alternatively, for example, the operation of the FET of the LED drive circuit may become unstable due to heat generation. Therefore, the power supply voltage of the LED is stabilized by designing the DCDC circuit with good transient response characteristics even coming with a cost.

US 2011/0050743 A discloses a driving method in which a controller delays a vertical synchronization signal Vsync to generate scan start signals (e.g., STH1, 2, and 3) and supply the scan start signals STH1, 2, and 3 to corresponding backlight drive circuits. The driving method described in US 2011/0050743 A relates to a driving method called backlight scan in which a plurality of LED groups (a plurality of scan units) are sequentially driven within one vertical scanning period (one frame), aims to improve moving image display quality, and the above problem may occur within the scan units.

An object of the present invention is to provide a backlight device that can avoid a problem caused by a plurality of LED drive circuits simultaneously changing LED drive current, and a liquid crystal display apparatus including such a backlight device.

According to embodiments of the present invention, solutions described in the following items are provided.

Item 1

A backlight device disposed on a back surface side of a liquid crystal display panel, the backlight device including:
- a plurality of LED elements arranged in a plurality of regions including a first region and a second region;
- a plurality of LED drive circuits each configured to generate a LED drive signal configured to drive the plurality of LED elements, the plurality of LED drive circuits including a first LED drive circuit associated with LED elements in the first region and a second LED drive circuit associated with LED elements in the second region;
- a control circuit configured to receive an image signal and output a vertical synchronization signal and current setting data configured to set luminance of each of the plurality of LED elements; and
- at least one time constant circuit configured to delay the vertical synchronization signal by a predetermined time,
- in which the at least one time constant circuit includes a first time constant circuit connected to the first LED drive circuit and/or a second time constant circuit connected to the second LED drive circuit, and
- the first LED drive circuit and/or the second LED drive circuit is configured to receive the current setting data output from the control circuit, and receive a first vertical synchronization signal or a second vertical synchronization signal delayed by the first time constant circuit or the second time constant circuit.

Item 2

The backlight device according to item 1,
- in which the plurality of regions further include a third region,
- the plurality of LED drive circuits further include a third LED drive circuit associated with LED elements in the third region,
- the at least one time constant circuit includes at least two time constant circuits among the first time constant circuit, the second time constant circuit, and a third time constant circuit connected to the third LED drive circuit, and
- at least two LED drive circuits of the first LED drive circuit, the second LED drive circuit, and the third LED drive circuit are configured to receive the current setting data output from the control circuit, and receive vertical synchronization signals delayed by predetermined times different from each other by the at least two time constant circuits.

Item 3

The backlight device according to item 1 or 2,
- in which the at least one time constant circuit includes a resistive element and a capacitance element.

Item 4

The backlight device according to any of items 1 to 3,
- in which the at least one time constant circuit is configured to be given two or more time constants.

Item 5
The backlight device according to item 4,
in which the at least one time constant circuit includes a resistive element, two or more capacitance elements, and two or more transistors respectively connected to the two or more capacitance elements.

Item 6
The backlight device according to item 4,
in which the at least one time constant circuit includes a transistor and a capacitance element.

Item 7
The backlight device according to any of items 1 to 6, further including:
a current detection circuit connected to one of the plurality of LED drive circuits to which the at least one time constant circuit is connected, the current detection circuit being configured to detect a current of LED elements associated with the one of the plurality of LED drive circuits.

Item 8
The backlight device according to any of items 1 to 7,
in which after receiving a vertical synchronization signal indicating start of a current vertical scanning period and before receiving a vertical synchronization signal indicating start of a next vertical scanning period, each of the plurality of LED drive circuits controls a current to be supplied to associated LED elements based on the current setting data regarding the current vertical scanning period.

Item 9
The backlight device according to any of items 1 to 8,
in which the plurality of regions are arrayed in a matrix shape having a plurality of rows and columns, and
a difference between delay times Da of vertical synchronization signals received by two of the plurality of LED drive circuits corresponding to two regions adjacent in a row direction is greater than a difference between delay times Db of vertical synchronization signals received by two of the plurality of LED drive circuits corresponding to two of the plurality of regions adjacent in a column direction.

Item 10
The backlight device according to item 9,
in which a difference between delay times Da of vertical synchronization signals received by two of the plurality of LED drive circuits corresponding to two of the plurality of regions adjacent in a row direction is constant regardless of a row.

Item 11
The backlight device according to item 9 or 10,
in which a difference between delay times Db of vertical synchronization signals received by two of the plurality of LED drive circuits corresponding to two of the plurality of regions adjacent in a column direction is constant regardless of a column.

Item 12
The backlight device according to any of items 1 to 11,
in which the at least one vertical synchronization signal includes a plurality of vertical synchronization signals, and
the at least one time constant circuit includes a plurality of time constant circuits that delay the plurality of vertical synchronization signals by a predetermined time.

Item 13
A liquid crystal display apparatus comprising:
a liquid crystal display panel; and
the backlight device according to any of items 1 to 12.

According to an embodiment of the present invention, a novel backlight device that can avoid a problem caused by a plurality of LED drive circuits simultaneously changing LED drive current, and a liquid crystal display apparatus including such a backlight device are provided.

DETAILED DESCRIPTION

Hereinafter, a backlight device and a liquid crystal display apparatus according to an embodiment of the present invention will be described with reference to the drawings. The backlight device and the liquid crystal display apparatus according to the embodiment of the present invention are not limited to those exemplified below.

Figure 1:
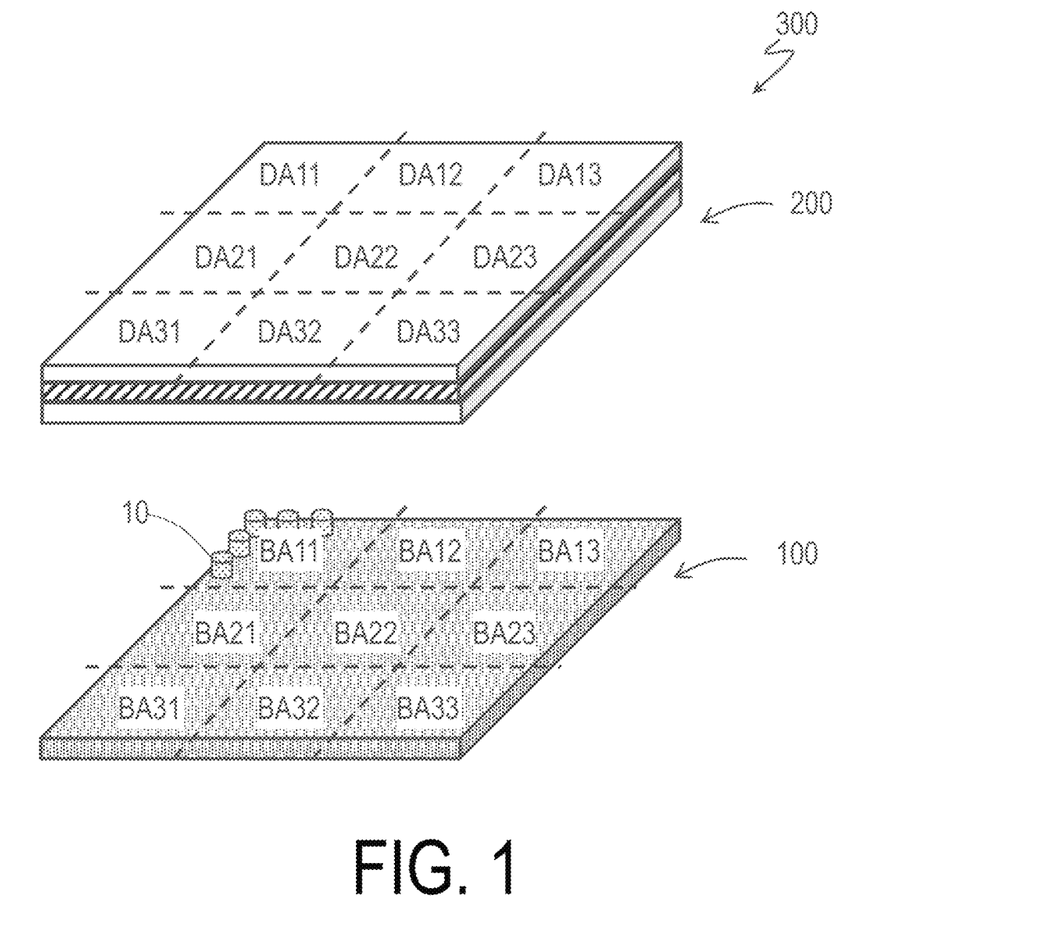
FIG. 1 is a schematic perspective view of a liquid crystal display apparatus 300 according to an embodiment of the present invention.

FIG. 1 is a schematic perspective view of the liquid crystal display apparatus 300 according to the embodiment of the present invention. The liquid crystal display apparatus 300 includes a liquid crystal display panel 200 and the backlight device 100 disposed on the back surface side of liquid crystal display panel 200.

The backlight device 100 exemplified here has nine regions BA11, BA12, BA13, BA21, BA22, BA23, BA31, BA32, and BA33 arrayed in three rows and three columns, and each region has a plurality of LED elements 10. The nine regions BA11, BA12, BA13, BA21, BA22, BA23, BA31, BA32, and BA33 (sometimes collectively called BA) irradiate nine regions DA11, DA12, DA13, DA21, DA22, DA23, DA31, DA32, and DA33 in a display region of the liquid crystal display panel 200 with light. Luminances of the regions BA11, BA12, BA13, BA21, BA22, BA23, BA31, BA32, and BA33 of the backlight device 100 can be controlled in accordance with images displayed in the regions DA11, DA12, DA13, DA21, DA22, DA23, DA31, DA32, and DA33 in the display region of the liquid crystal display panel 200. That is, the liquid crystal display apparatus 300 is a liquid crystal display apparatus that can perform local dimming.

Figure 2:
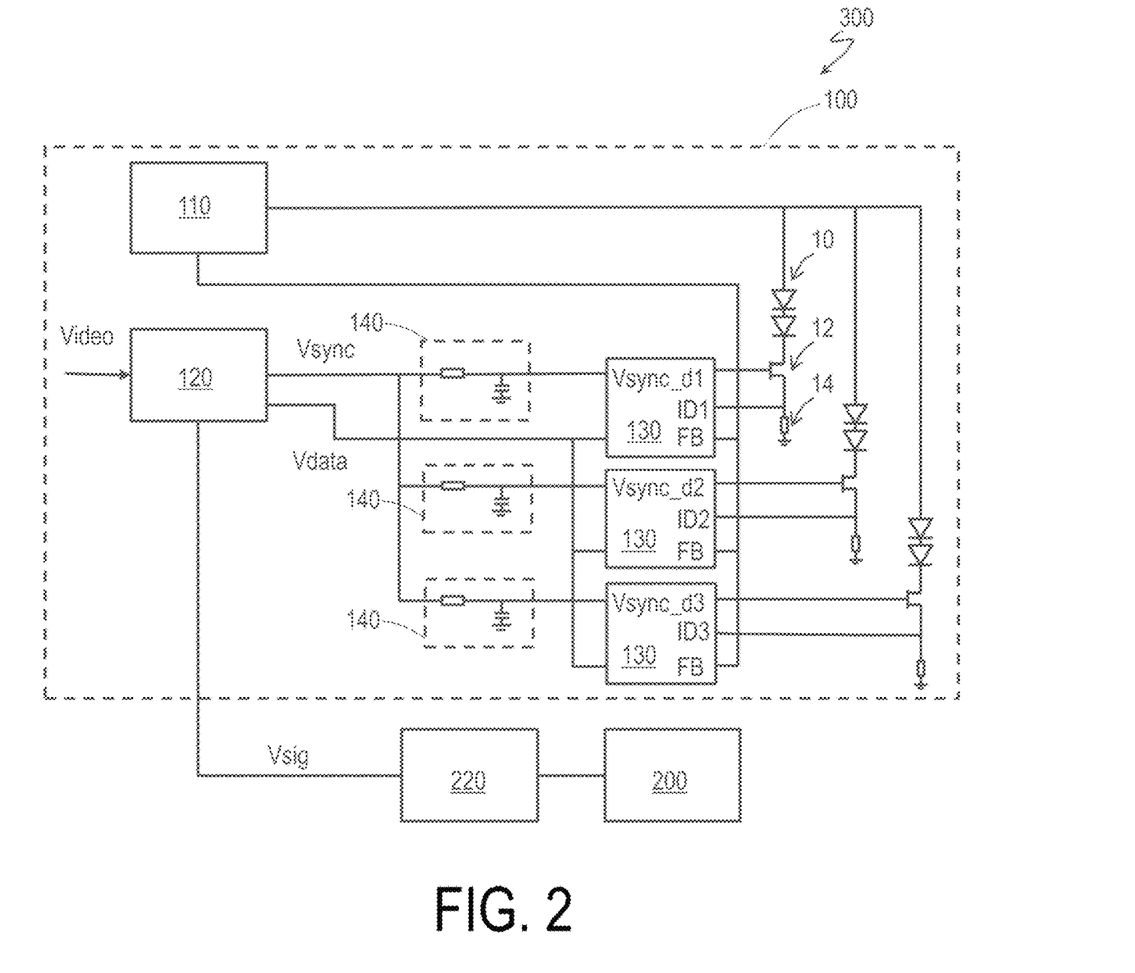
FIG. 2 is a schematic block diagram of the liquid crystal display apparatus 300 according to the embodiment of the present invention.

FIG. 2 is a schematic block diagram of the liquid crystal display apparatus 300 according to the embodiment of the present invention.

The liquid crystal display apparatus 300 includes the backlight device 100, the liquid crystal display panel 200, and an LCD control circuit (timing controller) 220 that drives the liquid crystal display panel 200. The backlight device 100 includes a power supply circuit 110, a control circuit (image processing IC) 120, a plurality of LED drive circuits 130 that generate LED drive signals configured to drive the LED elements 10 in each region BA, and the time constant circuit 140 arranged between the control circuit 120 and each of the LED drive circuits 130 and connected to the corresponding LED drive circuit 130.

The control circuit 120 receives an image signal Video from the outside, and outputs the vertical synchronization signal Vsync and current setting data Vdata for setting the luminance of the LED elements 10 in each region BA in accordance with a luminance signal of the image signal Video. Each time constant circuit 140 delays the vertical synchronization signal Vsync by a predetermined time. The delay time varies depending on the time constant circuit 140, and the time constant circuit 140 outputs the delayed vertical synchronization signal Vsync_d to the corresponding LED drive circuit 130.

The LED drive circuit 130 receives the current setting data Vdata from the control circuit 120 and receives the delayed vertical synchronization signal Vsync_d from the corresponding time constant circuit 140. The current setting data Vdata can be transmitted by using, for example, SPI. The control circuit 120 supplies a signal Vsig for driving the liquid crystal display panel 200 to an LCD control circuit 220 as, for example, a V by one (registered trademark) signal.

After receiving a vertical synchronization signal indicating the start of a current vertical scanning period (current frame) and before receiving a vertical synchronization signal indicating the start of a next vertical scanning period (next frame), the LED drive circuit 130 controls the current to be supplied to the LED element 10 based on the current setting data regarding the current vertical scanning period. The current setting data regarding the current vertical scanning period is received, for example, during the immediately preceding vertical scanning period (immediately preceding frame). In this example, the LED drive circuit 130 determines a duty ratio of the waveform of the voltage to be applied to the gate of the LED FET 12 based on the current setting data, and the LED drive current in accordance with the duty ratio flows through the LED element 10.

The LED element 10 is connected to the power supply circuit 110, and the luminance of the LED element 10 is adjusted at a desired luminance by the LED FET 12 controlling the drive current. By inputting the drive current of each of the LED elements 10 to IDs 1, 2, and 3 as voltage using the resistive element 14, the drive current of each of the LED elements 10 can be detected by the LED drive circuit 130. The power supply circuit 110 is a DCDC power supply circuit, and can raise and lower an output voltage of the DCDC power supply by a feedback (FB) output voltage from the LED drive circuit 130. Therefore, the current detection circuit that detects the current of the LED element can control the output voltage of the DCDC power supply while monitoring the drive current.

Figure 3:
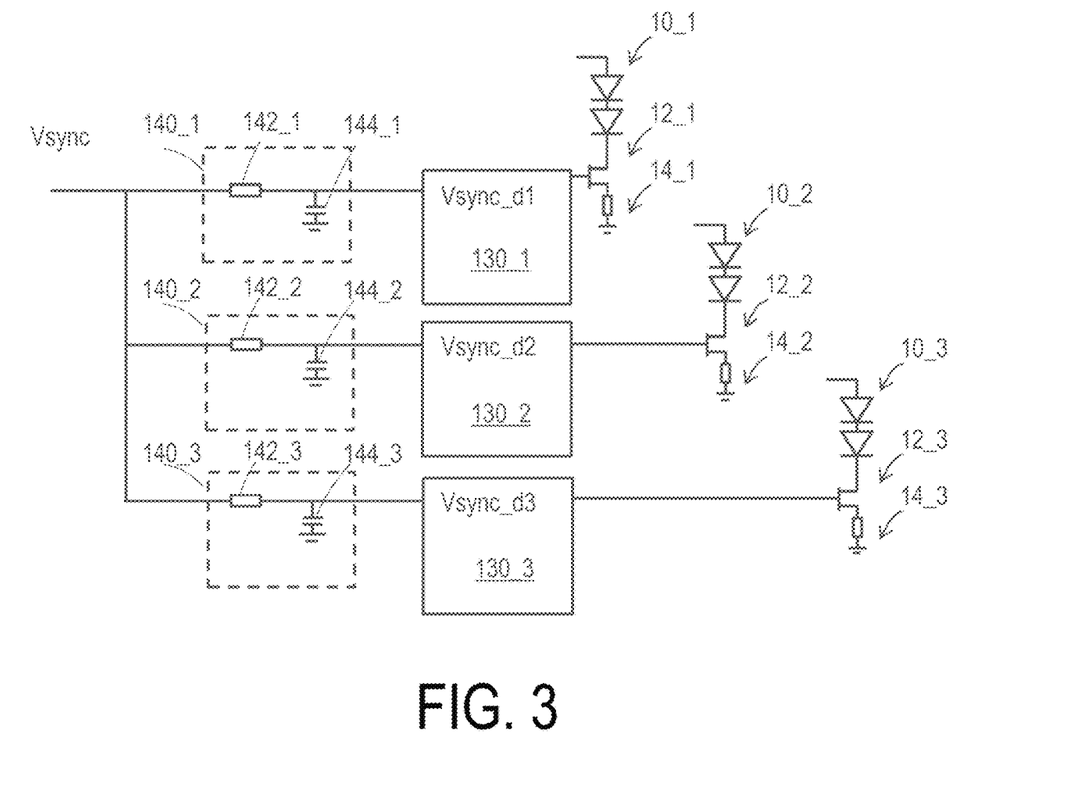
FIG. 3 is a block diagram for describing a configuration and an operation of a time constant circuit 140 included in a backlight device 100 according to the embodiment of the present invention.

Next, the configuration and the operation of the time constant circuit 140 included in the backlight device 100 will be described with reference to FIG. 3.

Drive of the LED elements 10 in three different regions (a first region, a second region, and a third region) will be described as an example. LED elements 10_1, 10_2, and 10_3, the LED FETs 12_1, 12_2, and 12_3, and resistive elements 14_1, 14_2, and 14_3 respectively represent the plurality of LED elements 10, the plurality of LED FETs 12, and the plurality of resistive elements 14 in the first region, the second region, and the third region.

The vertical synchronization signal Vsync output from the control circuit 120 is input to a time constant circuit 140_1 connected to an LED drive circuit 130_1 for driving the LED element 10_1 in the first region. The time constant circuit 140_1 includes a resistive element 142_1 and a capacitance element 144_1. The resistive element 142_1 and the capacitance element 144_1 are connected in series. The vertical synchronization signal Vsync becomes the vertical synchronization signal Vsync_d1 delayed by a predetermined time by the time constant circuit 140_1, and is input to the LED drive circuit 130_1.

Similarly, the vertical synchronization signal Vsync is input to a time constant circuit 140_2 connected to an LED drive circuit 130_2 for driving the LED element 10_2 in the second region. The time constant circuit 140_2 includes a resistive element 142_2 and a capacitance element 144_2. The resistive element 142_2 and the capacitance element 144_2 are connected in series. The vertical synchronization signal Vsync becomes the vertical synchronization signal Vsync_d2 delayed by a predetermined time by the time constant circuit 140_2, and is input to the LED drive circuit 130_2.

Similarly, the vertical synchronization signal Vsync is input to a time constant circuit 140_3 connected to an LED drive circuit 130_3 for driving the LED elements 10_3 in the third region. The time constant circuit 140_3 includes a resistive element 142_3 and a capacitance element 144_3. The resistive element 142_3 and the capacitance element 144_3 are connected in series. The vertical synchronization signal Vsync becomes the vertical synchronization signal Vsync_d3 delayed by a predetermined time by the time constant circuit 140_3, and is input to the LED drive circuit 130_3.

For example, delay time of each of the delayed vertical synchronization signals Vsync_d1, Vsync_d2, and Vsync_d3 can be adjusted as follows. For example, the output voltage of the DCDC power supply 110 is set to 6 V.

When the resistance values of the resistive elements 142_1, 142_2, and 142_3 are each 100Ω, and the capacitance values of the capacitance elements 144_1, 144_2, and 144_3 are 0.1 μF, 0.2 μF, and 0.3 μF, respectively, the delay times td become 50 μs, 100 μs, and 150 μs, respectively.

As described above, since the timing at which the LED drive circuits 130_1, 130_2, and 130_3 provided for the respective regions change the LED drive current is shifted from the vertical synchronization signal Vsync, the timing at which the rush current is generated in drive of the LED FETs 12_1, 12_2, and 12_3 is shifted. Then, the drop of the power supply voltage of the LED is reduced. Therefore, it is no longer necessary to set the power supply voltage of the LED higher than the Vf voltage of the LED. Since the heat generation of the LED FETs 12_1, 12_2, and 12_3 is reduced and the operation is stabilized, there is no need to design the DCDC circuit with good transient response characteristics, and the circuit scale can be reduced.

According to the embodiment of the present invention, simply by adding a time constant circuit using the existing controller (image processing IC) 120, a problem caused by a plurality of LED drive circuits simultaneously changing the LED drive current can be avoided.

Note that the liquid crystal display apparatus according to the embodiment of the present invention includes at least two regions in the display region of the liquid crystal display panel, the backlight device is only required to include at least two regions, and the liquid crystal display apparatus is only required to include at least one time constant circuit 140.

Next, the configuration and the operation of another time constant circuit that can be included in the backlight device 100 according to the embodiment of the present invention will be described with reference to FIGS. 4 and 5. Time constant circuits 150_1, 150_2, and 150_3 are each configured to be given two time constants. That is, the time constant circuits 150_1, 150_2, and 150_3 are each configured to change time during which the vertical synchronization signal Vsync is caused to be delayed (in this case, to select two different delay times).

Figure 4:
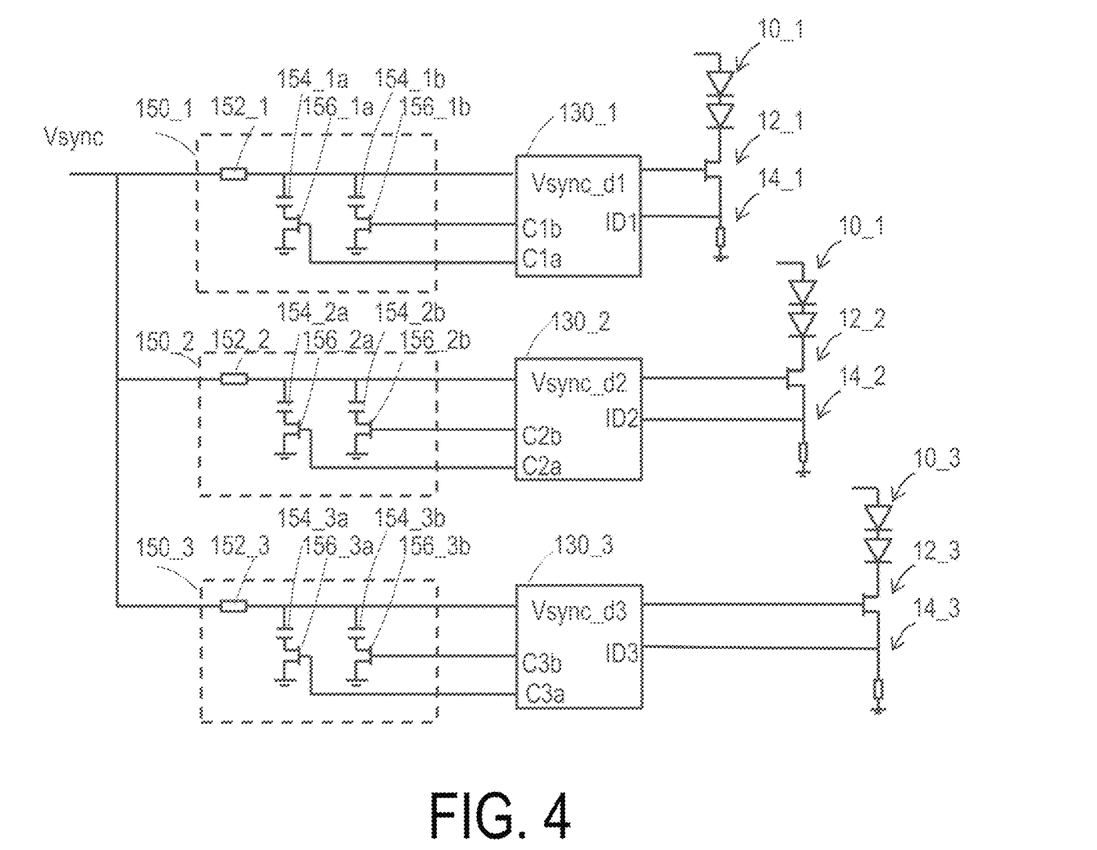
FIG. 4 is a block diagram for describing a configuration and an operation of another time constant circuit that can be included in the backlight device 100 according to the embodiment of the present invention.

As illustrated in FIG. 4, the time constant circuit 150_1 includes a resistive element 152_1, two capacitance elements 154_1a and 154_1b, and two FETs 156_1a and 156_1b respectively connected to the two capacitance elements 154_1a and 154_1b. In order to give more than two time constants, it is only required to provide three or more sets of capacitance elements and FETs.

Similarly, the time constant circuit 150_2 includes a resistive element 152_2, two capacitance elements 154_2a and 154_2b, and two FETs 156_2a and 156_2b respectively connected to the two capacitance elements 154_2a and 154_2b. The time constant circuit 150_3 includes a resistive element 152_3, two capacitance elements 154_3a and 154_3b, and two FETs 156_3a and 156_3b respectively connected to the two capacitance elements 154_3a and 154_3b. The capacitance elements 154_1a, 2a, and 3a are sometimes referred to as first capacitance elements, and the capacitance elements 154_1b, 2b, and 3b are sometimes referred to as second capacitance elements. The FETs 156_1a, 2a, and 3a are sometimes referred to as first FETs, and the FETs 156_1b, 2b, and 3b are sometimes referred to as second FETs.

The LED drive circuit 130_1 outputs a gate signal G_1a for turning on/off the gate of the FET 156_1a from a terminal C_1a, and outputs a gate signal G_1b for turning on/off the gate of the FET 156_1b from a terminal C_1b. By changing the combined capacitance value of the two capacitance elements 154_1a and 154_1b by controlling the gate signals G_1a and G_1b, two different time constants can be given in a driving state (lighting state) of the LED element 10.

Figure 5:
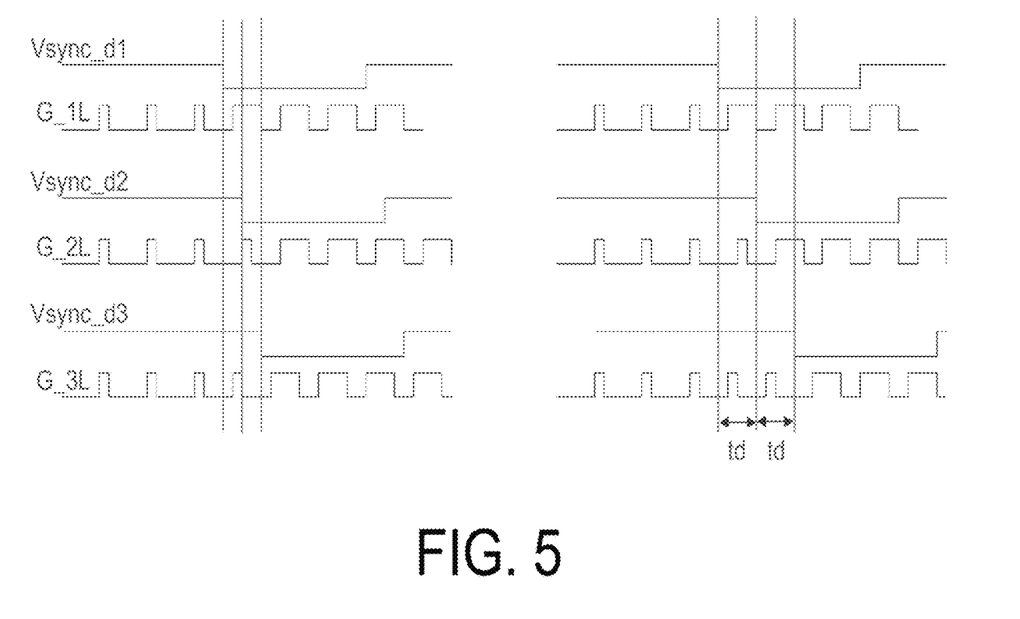
FIG. 5 is a view illustrating delayed vertical synchronization signals Vsync_d1, Vsync_d2, and Vsync_d3 and waveforms of voltages to be applied to gates of LED FETs 12_1, 12_2, and 12_3, respectively.

FIG. 5 illustrates delayed vertical synchronization signals Vsync_d1, Vsync_d2, and Vsync_d3 and waveforms of voltages to be applied to gates of LED FETs 12_1, 12_2, and 12_3, respectively. The left side in each waveform drawing illustrates waveforms in a state where only the FET 156_1a, the FET 156_2a, and the FET 156_3a are turned on, and the right side illustrates waveforms in a state where both the FETs 156_1a and 1b, both the FETs 156_2a and 2b, and both the FETs 156_3a and 3b are turned on. When the capacitance values of the two capacitance elements 154_1a and 154_1b, the two capacitance elements 154_2a and 154_2b, and the two capacitance elements 154_3a and 154_3b are all equal, the delay time td illustrated on the right side in FIG. 5 (the delay time td when both the first FET and the second FET are turned on) is twice the delay time td illustrated on the left side in FIG. 5 (the delay time td when only the first FET is turned on). Of course, the capacitance value of each of the capacitance elements can be set independently.

For example, when the power supply voltage of the LED drops due to the rush current of the LED element, the drive current of the LED element decreases. When the current detection circuit that detects the current of the LED element detects that the drive current has fallen below a set value, the second FET is turned on to increase the capacitance value of the time constant circuit (combined capacitance of the first capacitance element and the second capacitance element). Then, the rush current is dispersed, and the drop of the power supply voltage of the LED does not occur (becomes higher than Vf). When the current detection circuit detects that the drive current has become the set value, the second FET is turned off to decrease the capacitance value of the time constant circuit (only the capacitance value of the first capacitance element).

Since the direct-current resistance of the LED element 10 is less at the time of the first activation, the rush current may be great. Therefore, the second FET may be set to be turned on at the time of the first activation.

Figure 6:
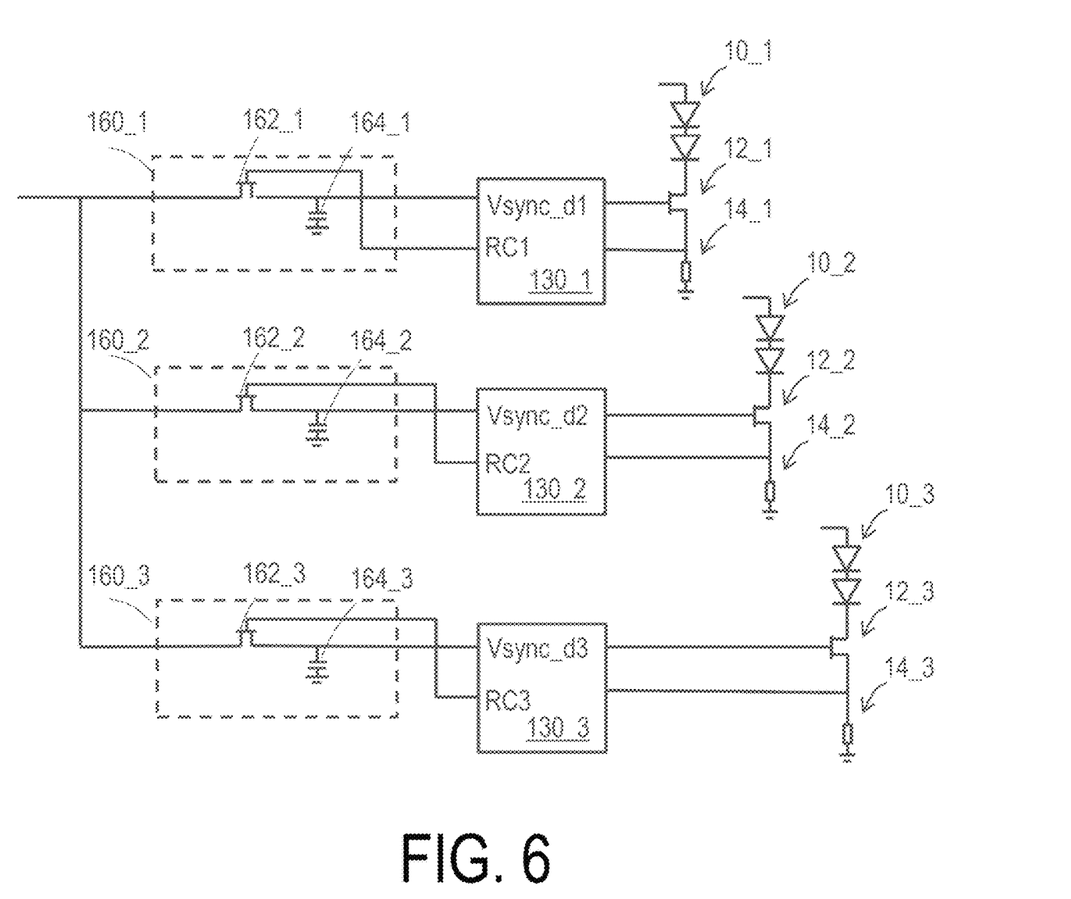
FIG. 6 is a block diagram for describing a configuration and an operation of still another time constant circuit that can be included in the backlight device 100 according to the embodiment of the present invention.

With reference to FIG. 6, the configuration and the operation of still another time constant circuit that can be included in the backlight device 100 according to the embodiment of the present invention will be described. Time constant circuits 160_1, 160_2, and 160_3 are each configured to be given two or more time constants. That is, the time constant circuits 160_1, 160_2, and 160_3 are each configured to change time during which the vertical synchronization signal Vsync is caused to be delayed.

As illustrated in FIG. 6, the time constant circuit 160_1 includes an FET 162_1 and a capacitance element 164_1. An output RC1 of the LED drive circuit 130_1 is connected to the gate of the FET 162_1. As the FET 162_1, an FET (for example, a P-channel FET) whose on-resistance changes depending on the gate voltage is used, and the time constant of the time constant circuit 160_1 can be changed by the voltage of the output RC1.

The time constant circuit 160_2 includes an FET 162_2 and a capacitance element 164_2. An output RC2 of the LED drive circuit 130_2 is connected to the gate of the FET 162_2, and the time constant of the time constant circuit 160_2 can be changed by the voltage of the output RC2. Similarly, the time constant circuit 160_3 includes an FET 162_3 and a capacitance element 164_3. An output RC3 of the LED drive circuit 130_3 is connected to the gate of the FET 162_3, and the time constant of the time constant circuit 160_3 can be changed by the voltage of the output RC3.

For example, with the capacitance values of the capacitance elements 164_1, 164_2, and 164_3 being all the same, by using the same P-channel FETs as the FETs 162_1, 162_2, and 162_3, and lowering the gate voltages to be output from the outputs RC1, RC2, and RC3, for example, changing the on-resistance of the P-channel FET from 4Ω to 8Ω, the delay time can be doubled as illustrated in FIG. 5.

Next, an example of setting of the delay time and arrangement of the time constant circuit in a case where the backlight device has 12 regions arrayed in a matrix shape having four rows and three columns will be described with reference to FIGS. 7 to 9.

The time constant of the above-described time constant circuit can be variously set using a resistive element, a capacitance element, and an FET. The circuit design can be simplified by setting the delay time of each region in accordance with a law when the region is divided into a greater number of regions.

Figure 7:
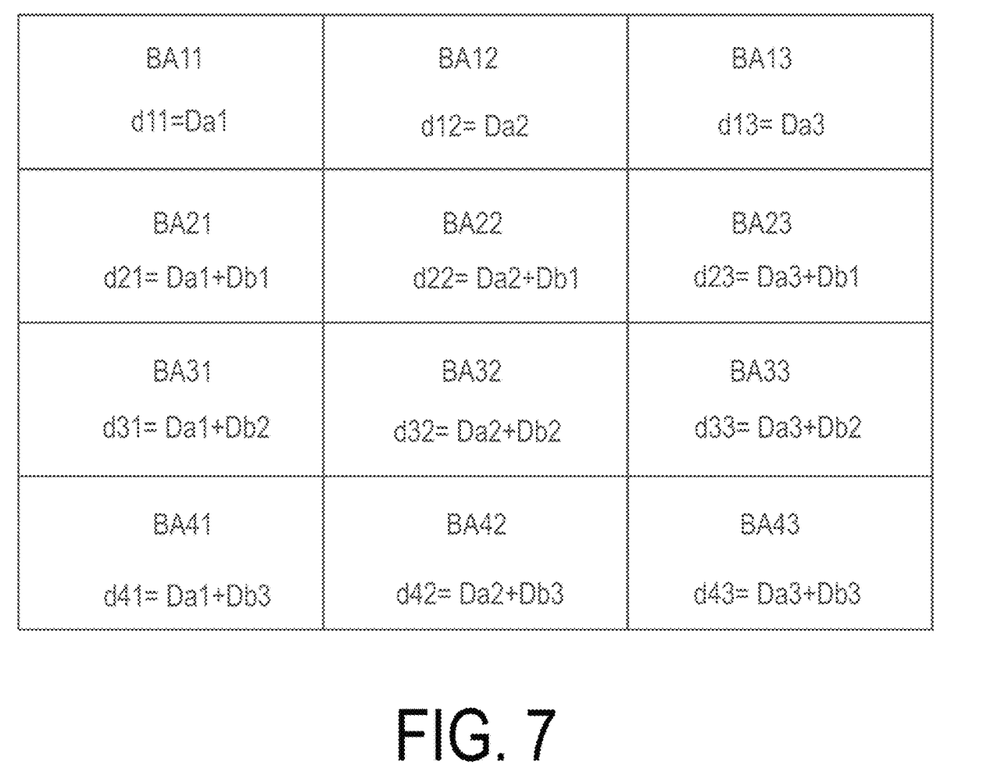
FIG. 7 is a schematic view illustrating an example of arrangement of a plurality of regions in the backlight device according to the embodiment of the present invention.

FIG. 7 is a schematic view illustrating an example of the arrangement of a plurality of regions in the backlight device. In the example illustrated in FIG. 7, the regions of the first column, the second column, and the third column of the first row are regions BA11, BA12, and BA13, respectively, the regions of the first column, the second column, and the third column of the second row are regions BA21, BA22, and BA23, respectively, the regions of the first column, the second column, and the third column of the third row are regions BA31, BA32, and BA33, respectively, and the regions of the first column, the second column, and the third column of the fourth row are regions BA41, BA42, and BA43, respectively. In the lower part of each region in FIG. 7, delay times d11, d21, . . . , and d43 of the delayed vertical synchronization signal to be supplied to the regions BA11, BA21, . . . , and BA43 are indicated. Here, for each of the regions BA11, BA21, . . . , and BA43, it is preferable that the delayed vertical synchronization signals (Vsync_d11, Vsync_d21, . . . , and Vsync_d43 in FIG. 9) have different timings. It is more preferable to prevent a plurality of delayed vertical synchronization signals from being continuous at equal intervals. That is, it is preferable to set the delay time so as to satisfy the relationship of $(Da2-Da1) \neq (Da3-Da2)$ and $Db1 \neq (Db2-Db1) \neq (Db3-Db2)$. For example, the setting is as follows.

Delay times Da1, Da2, and Da3 different from one another are set for the regions BA11, BA12, and BA13, respectively, included in the first row. For example, $Da1<Da2<Da3$, $(Da2-Da1)<(Da3-Da2)$.

Assume that the delay times of the regions BA21, BA22, and BA23 included in the second row are obtained by adding a certain delay time Db1 to the delay times of the regions BA11, BA12, and BA13, respectively. That is, the delay times Da1+Db1, Da2+Db1, and Da3+Db1 are set for the regions BA21, BA22, and BA23. For example, $Db1<Da1$ and $Db1<(Da2-Da1)$.

Assume that the delay times of the regions BA31, BA32, and BA33 included in the third row are obtained by adding a certain delay time Db2 to the delay times of the regions BA11, BA12, and BA13, respectively. That is, the delay times Da1+Db2, Da2+Db2, and Da3+Db2 are set for the regions BA31, BA32, and BA33. For example, $Db2>Db1$. Also, $Db2<(Da2-Da1)$.

Assume that the delay times of the regions BA41, BA42, and BA43 included in the fourth row are obtained by adding a certain delay time Db3 to the delay times of the regions BA11, BA12, and BA13, respectively. That is, the delay times Da1+Db3, Da2+Db3, and Da3+Db3 are set for the regions BA41, BA42, and BA43. For example, $Db3>Db2$. Also, $Db3<(Da2-Da1)$.

A difference (Da2−Da1, Da3−Da2) between the delay times of the vertical synchronization signals received by the two LED drive circuits corresponding to the two regions adjacent in the row direction is made greater than a difference (Db1, Db2−Db1, Db3−Db2) between the delay times of the vertical synchronization signals received by the two LED drive circuits corresponding to the two regions adjacent in the column direction.

In the example illustrated in FIG. 7, the difference between the delay times of the two vertical synchronization signals received by LED drive circuits corresponding to the two regions adjacent in the row direction is constant regardless of the row. The difference between the delay times of the vertical synchronization signals received by the two LED drive circuits corresponding to the two regions adjacent in the column direction is constant regardless of the column.

Figure 8:
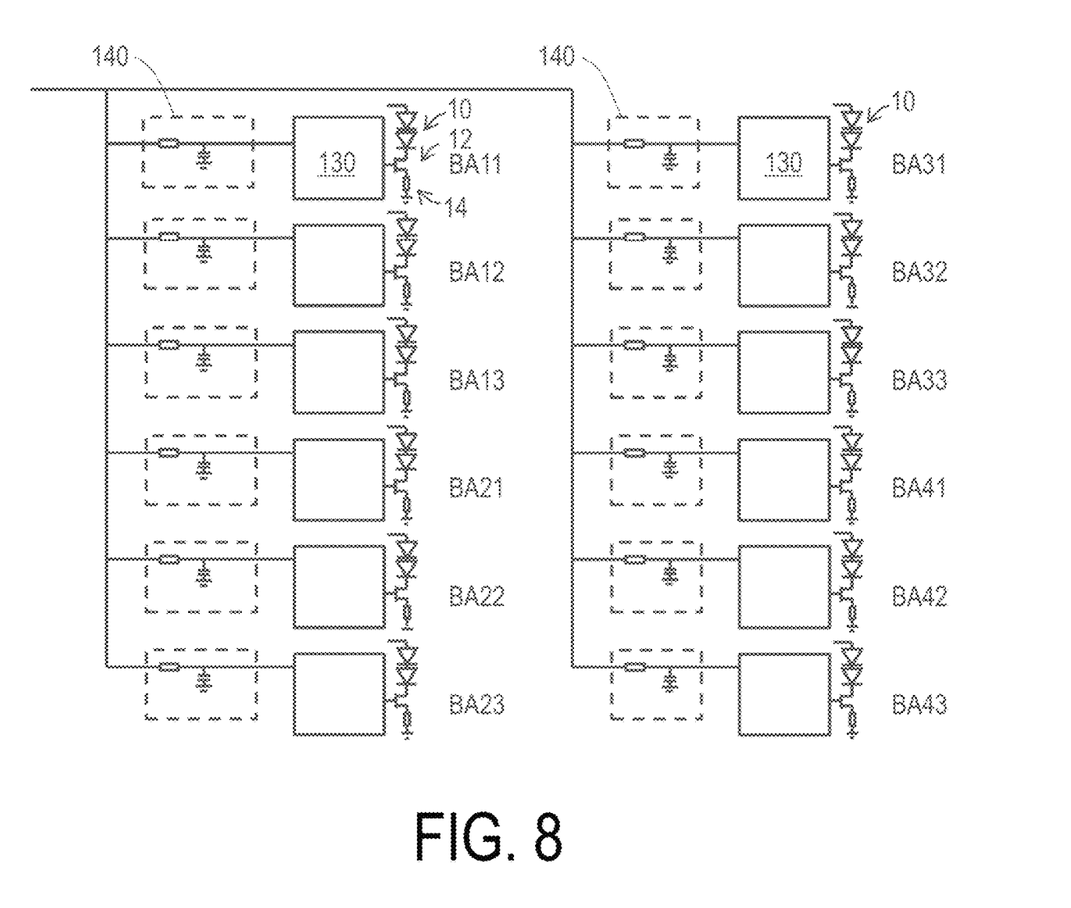
FIG. 8 is a schematic view illustrating an arrangement example of a time constant circuit in a backlight device having a plurality of regions of the arrangement illustrated in FIG. 7.

FIG. 8 illustrates a schematic view of an arrangement example of the time constant circuit in the backlight device having the plurality of regions of the arrangement illustrated in FIG. 7. The setting of the delay time illustrated in FIG. 7 can be achieved, for example, by setting the capacitance value of the time constant circuit 140 illustrated in FIG. 8 to become the delay time of each region.

That is, the time constant circuit 140 corresponding to the region BA11 is set to be given the delay time Da1, the time constant circuit 140 corresponding to the region BA12 is set to be given the delay time Da2, and the time constant circuit 140 corresponding to the region BA13 is set to be given the delay time Da3.

For the time constant circuits 140 corresponding to the regions BA21, BA22, and BA23, the capacitance values of the time constant circuits 140 corresponding to the regions BA11, BA12, and BA13 are increased so as to lengthen the delay time by Db1.

Similarly, the capacitance values of the time constant circuits 140 corresponding to the region BA31, the region BA32, and the region BA33, and the capacitance values of the time constant circuits 140 corresponding to the region BA41, the region BA42, and the region BA43 are increased.

Figure 9:
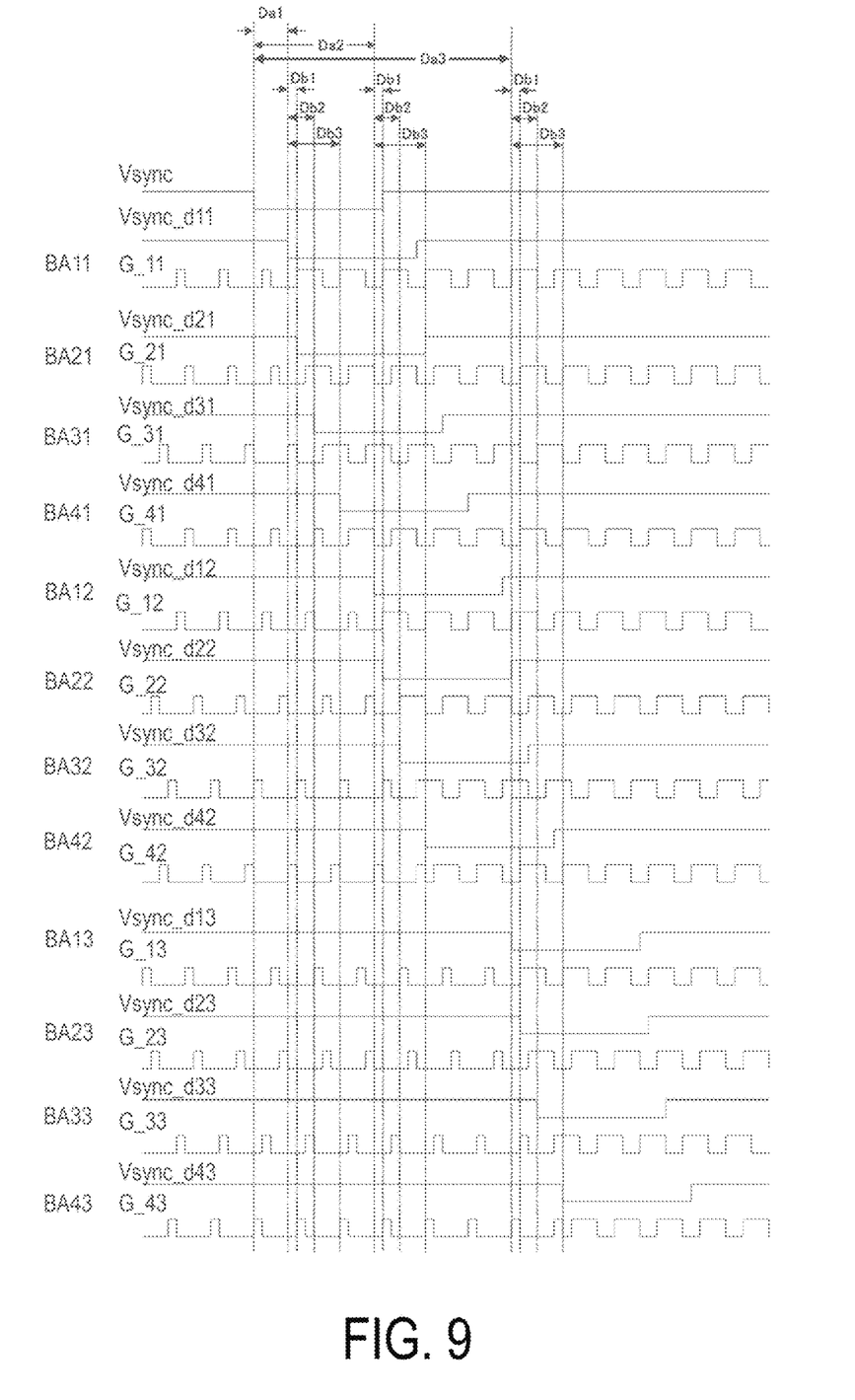
FIG. 9 is a view illustrating delayed vertical synchronization signals Vsync_d11, Vsync_d21, ..., and Vsync_d43 and waveforms of voltages to be applied to the gates of the LED FETs 12 for the respective regions illustrated in FIG. 7.

FIG. 9 illustrates delayed vertical synchronization signals Vsync_d11, Vsync_d21, . . . , and Vsync_d43 and waveforms of voltages to be applied to the gates of the LED FETs 12 for the respective regions illustrated in FIG. 7.

The value of the delay time can be appropriately set in accordance with a falling time constant of the rush current, for example. For example, Da1=0 µs, Da2=260 µs, Db3=300 µs, Db1=50 µs, Db2=110 µs, and Db3=180 µs are set.

By setting the delay time as described above, a great rush current can be dispersed in the horizontal direction (in a region included in the same row) and a less rush current in the vertical direction (in a region included in the same column). By making the timings of the delayed vertical synchronization signals different for each of the divided regions, electro magnetic interference (EMI) caused by the power supply can be reduced. By preventing continuation of a plurality of delayed vertical synchronization signals at equal intervals, for example, the sounding can be suppressed. For example, when a plurality of delayed vertical synchronization signals are continuous at equal intervals, sound on the order of KHz caused by power supply ripple from a circuit substrate may enter a human audible range (20 to 20 KHz).

Figure 10:
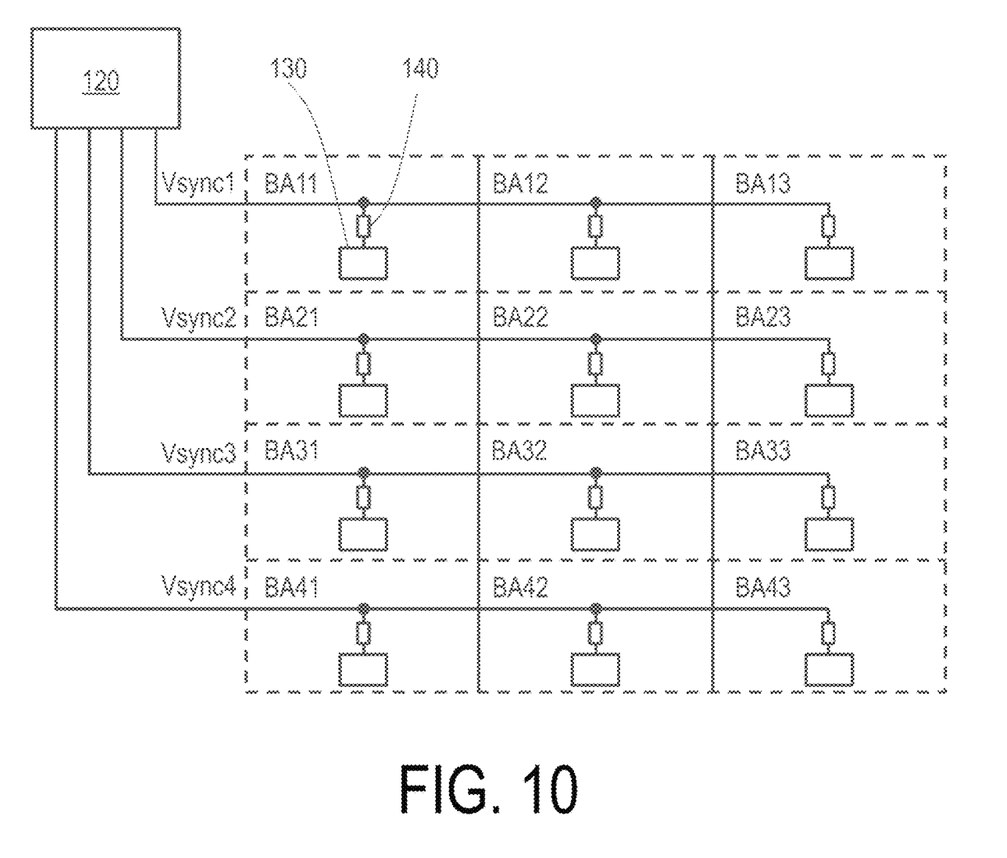
FIG. 10 is a schematic view illustrating an example of arrangement of a plurality of regions in a backlight device that can perform backlight scan according to the embodiment of the present invention.

FIG. 10 is a schematic view illustrating an example of the arrangement of a plurality of regions in the backlight device that can perform backlight scan according to the embodiment of the present invention.

In the backlight device illustrated in FIG. 10, the control circuit 120 outputs a plurality of vertical synchronization signals Vsync1, Vsync2, Vsync3, and Vsync4 having phases different from one another. The plurality of vertical synchronization signals Vsync1, Vsync2, Vsync3, and Vsync4 are used for sequentially driving the LED elements in synchronization with line sequential driving of the liquid crystal display panel. This backlight device includes a plurality of time constant circuits that delay each of the plurality of vertical synchronization signals Vsync1, Vsync2, Vsync3, and Vsync4 by a predetermined time. For example, the delay time is controlled for each region where each scan unit of backlight scan (a region of a row (may be a plurality of rows) having the same vertical synchronization signal before delay) is divided into a plurality of columns. For example, each of Vsync1, Vsync2, Vsync3, and Vsync4 is supplied to a region (scan unit) including m rows (m: positive integer) of LED elements, each scan unit is divided into a region including n columns of LED elements, and a delay time is controlled for each segmented region (including m rows and n columns of LED elements). Of course, the number of vertical synchronization signals generated by the control circuit 120 and the number of segmented regions can be appropriately adjusted in accordance with the size of the liquid crystal display panel, the number of pixels, and the like.

Another transistor can be used instead of the FET included in the backlight device of the above embodiment. The time constant circuit 140 can be mounted on, for example, a back surface (a surface opposite to the surface on which the LED element 10 is arranged) or a front surface of a LED substrate on which the LED element 10 is arranged. The FET 12 and the resistive element 14 can be formed on a back surface or a front surface of the LED substrate.

The backlight device according to the embodiment of the present invention is suitably used for a large or high-definition liquid crystal display apparatus.

While there have been described what are at present considered to be certain embodiments of the application, it will be understood that various modifications may be made thereto, and it is intended that the appended claim cover all such modifications as fall within the true spirit and scope of the application.

What is claimed is:

1. A backlight device disposed on a back surface side of a liquid crystal display panel, the backlight device comprising:
    a plurality of LED elements arranged in a plurality of regions including a first region and a second region;
    a plurality of LED drive circuits configured to generate LED drive signal s configured to drive the plurality of LED elements, the plurality of LED drive circuits including a first LED drive circuit associated with LED elements in the first region and a second LED drive circuit associated with LED elements in the second region;
    a control circuit configured to receive an image signal and output at least one vertical synchronization signal and current setting data configured to set luminance of each of the plurality of LED elements; and
    at least one time constant circuit configured to delay the at least one vertical synchronization signal by a predetermined time,
    wherein the at least one time constant circuit includes a first time constant circuit connected to the first LED drive circuit and/or a second time constant circuit connected to the second LED drive circuit, and
    the first LED drive circuit is configured to receive the current setting data output from the control circuit, and receive a first vertical synchronization signal delayed by the first time constant circuit and/or the second LED drive circuit is configured to receive the current setting data output from the control circuit, and receive a second vertical synchronization signal delayed by the second time constant circuit.

2. The backlight device according to claim 1,
    wherein the plurality of regions further include a third region,
    the plurality of LED drive circuits further include a third LED drive circuit associated with LED elements in the third region,
    the at least one time constant circuit includes at least two time constant circuits among the first time constant circuit, the second time constant circuit, and a third time constant circuit connected to the third LED drive circuit, and
    at least two LED drive circuits of the first LED drive circuit, the second LED drive circuit, and the third LED drive circuit are configured to receive the current setting data output from the control circuit, and receive vertical synchronization signals delayed by predetermined times different from each other by the at least two time constant circuits.

3. The backlight device according to claim 1,
    wherein the at least one time constant circuit includes a resistive element and a capacitance element.

4. The backlight device according to claim 1,
    wherein the at least one time constant circuit is configured to be given two or more time constants.

5. The backlight device according to claim 4,
    wherein the at least one time constant circuit includes a resistive element, two or more capacitance elements, and two or more transistors respectively connected to the two or more capacitance elements.

6. The backlight device according to claim 4,
    wherein the at least one time constant circuit includes a transistor and a capacitance element.

7. The backlight device according to claim 1, further comprising:
    a current detection circuit connected to one of the plurality of LED drive circuits to which the at least one time constant circuit is connected, the current detection circuit being configured to detect a current of LED elements associated with the one of the plurality of LED drive circuits.

8. The backlight device according to claim 1,
    wherein after receiving a vertical synchronization signal indicating start of a current vertical scanning period and before receiving a vertical synchronization signal indicating start of a next vertical scanning period, each of the plurality of LED drive circuits controls a current to be supplied to associated LED elements based on the current setting data regarding the current vertical scanning period.

9. The backlight device according to claim 1,
    wherein the plurality of regions are arrayed in a matrix shape having a plurality of rows and columns, and
    a difference between delay times Da of vertical synchronization signals received by two of the plurality of LED drive circuits corresponding to two regions adjacent in a row direction is greater than a difference between delay times Db of vertical synchronization signals received by two of the plurality of LED drive circuits corresponding to two of the plurality of regions adjacent in a column direction.

10. The backlight device according to claim 9,
    wherein a difference between delay times Da of vertical synchronization signals received by two of the plurality of LED drive circuits corresponding to two of the plurality of regions adjacent in a row direction is constant regardless of a row.

11. The backlight device according to claim 9,
wherein a difference between delay times Db of vertical synchronization signals received by two of the plurality of LED drive circuits corresponding to two of the plurality of regions adjacent in a column direction is constant regardless of a column.

12. The backlight device according to claim 1,
wherein the at least one vertical synchronization signal includes a plurality of vertical synchronization signals, and
the at least one time constant circuit includes a plurality of time constant circuits that delay the plurality of vertical synchronization signals by a predetermined time.

13. A liquid crystal display apparatus comprising:
a liquid crystal display panel; and
the backlight device according to claim 1.

* * * * *